United States Patent [19]

Kajiyama

[11] Patent Number: 5,079,759

[45] Date of Patent: Jan. 7, 1992

[54] MULTIPLEX TRANSMISSION SYSTEM FOR VEHICLES HAVING A FAILURE DIAGNOSIS FUNCTION

[75] Inventor: Hiroshi Kajiyama, Hiroshima, Japan

[73] Assignee: Mazda Motor Corporation, Hiroshima, Japan

[21] Appl. No.: 572,229

[22] Filed: Aug. 24, 1990

[30] Foreign Application Priority Data

Aug. 30, 1989 [JP] Japan ................................. 1-223823

[51] Int. Cl.$^5$ .......................... H04J 1/16; H04J 3/14
[52] U.S. Cl. ........................................ 370/13; 370/14; 370/16; 371/15.1
[58] Field of Search .................... 370/13, 14, 16, 15; 340/825.08; 371/29.5, 17, 15.1, 29.1

[56] References Cited

U.S. PATENT DOCUMENTS

| | | |
|---|---|---|
| 4,334,308 | 6/1982 | Thinschmidt et al. ............... 371/17 |
| 4,750,175 | 6/1988 | Brenneman et al. ............... 370/14 |
| 4,817,418 | 4/1989 | Asami et al. ............... 371/29.1 |
| 4,910,733 | 3/1990 | Sommani et al. ............... 370/13 |

Primary Examiner—Douglas W. Olms
Assistant Examiner—Dang Ton

[57] ABSTRACT

In a multiplex transmission system for vehicles a transmission path is made usually in the form of a loop, where one master-like supervisory node and a plurality of slave-like ordinary nodes are connected to the path. During diagnosis, this transmission path is interrupted, thus interrupting the loop. On the interrupted transmission path, the master supervisory node causes a diagnostic signal to flow in the two directions of the transmission path. The supervisory node pinpoints the position of a line disconnection in the transmission path on the basis of a reception confirmation signal received regarding respective directions from each of the ordinary nodes.

12 Claims, 8 Drawing Sheets

MULTIPLEX TRANSMISSION SYSTEM FOR VEHICLES HAVING A FAILURE DIAGNOSIS FUNCTION

BACKGROUND OF THE INVENTION

The present invention relates to a multiplex transmission system for vehicles that consists of a plurality of multiplex communication nodes which send and receive, by means of multiplex communication, information necessary for various kinds of electrical equipment related to numerous types of switches, meters or a steering provided in a vehicle. The present invention relates to the detection of the presence of a line disconnection of a multiplex transmission path formed in the form of a loop (i.e. a ring) as well as the locations of the above-mentioned disconnection and a defective node.

Regarding a network topology in a multiplex transmission system of this type for vehicles, various types of configurations, such as loop (ring) connection, bus connection, and star connection have been previously proposed. Each topology has its own features. For example, in the Japanese Patent Laid-Open No. 62-4658, a multiplex transmission path is made in the form of a loop (a ring). The reason for this is that if a line disconnection occurs at merely one place in the transmission path in a bus connection or a star connection, a specific node breaks down. On the other hand, making the transmission path in the form of a loop or a ring insures that a signal can be sent and received even if this transmission path is disconnected at one place.

In the above-mentioned loop or ring network, however, although signal transmission is possible even in a state with one line disconnection, it is difficult to know that it has occurred, because signal transmission is performed normally. Also, in a loop or ring network, where a disconnection occurs in a part of the transmission path, some degree of communication is insured. However, since the impedance of the line path is changed, noise resistance capability is decreased. Therefore, it is important to know that the line disconnection has occurred.

In a network such as a general LAN (Local Area Network), if a disconnection of a transmission path occurs, the entire system will not break down because of the breaking down of some terminals. However, in a multiplex communication system for vehicles, for example, if a node for meters breaks down due to a line disconnection, because the meter has become inoperable, the automobile itself cannot be driven as no alternatives for the meter node are available. Hence, if the presence of a line disconnection at one place is left unfixed and then another line disconnection occurs at another place, or if a transmission error occurs intermittently due to noise, this will lead to a complete breakdown of the vehicle.

Therefore, the present technology, as in the above-mentioned prior art, is not capable of insuring that a vehicle can be driven even in the case of a line disconnection and thus this technology cannot satisfy the requirements for the present-day multiplex communication system for vehicles. In order to meet the requirement, it is necessary at least to be able inform a driver or a service man at a service station of the presence of a line disconnection or the like before the vehicle breaks down, and further, it is important to easily locate the position of the line disconnection and defective nodes.

SUMMARY OF THE INVENTION

The present invention has been devised in light of the above-mentioned circumstances.

An object of the present invention is to provide a multiplex transmission system for vehicles which is capable of detecting a disconnection of a transmission path.

Another object of the present invention is to provide a multiplex transmission system for vehicles which makes a failure location in a transmission path and a defective node easy.

In order to achieve the above-mentioned objects, there is provided the multiplex transmission system for vehicles having a transmission path made in the form of a ring and a plurality of communication nodes connected to the transmission path in order to communicate information for controlling a vehicle with the other nodes, comprising: the plurality of communication nodes having the respective reception confirmation signal output circuits each of that outputs a reception confirmation signal on the transmission path when a predetermined diagnosis signal is received from the transmission path; a transmission path interruption means for interrupting the ring formed by the transmission path at any one place in the multiplex transmission path; a first transmission and reception means for outputting firstly the diagnosis signal to the interrupted transmission path from one end of the interrupted point and for receiving the reception confirmation signal from each of the plurality of communication nodes in response to the diagnosis signal; a second transmission and reception means for outputting secondly the diagnosis signal on the interrupted transmission path from another end of the interrupted point and for receiving the reception confirmation signal from each of said plurality of communication nodes in response to the diagnosis signal; and a location means for locating the position of a disconnection in the transmission path or a defective node on the basis of the reception confirmation signal received by the first and second transmission and reception means.

According to a preferred embodiment of the present invention, a supervisory node having the transmission path interruption means, the first and second transmission and reception means, and the location means, is installed in the present system. That is, since the above-mentioned diagnosis function can be added to the multiplex communication nodes used in an ordinary operation, it will not be necessary to add, for example, a specialized device for diagnosis at a service station or the like.

According to the preferred embodiment of the present invention, the first and second transmission and reception means are comprised so as to have a transmission and reception circuit common to each other. That is, a circuit required for diagnosis can be made smaller.

According to the preferred embodiment of the present invention, a diagnosis is performed on the basis of the number of the multiplex communication nodes which have responded to the diagnosis signal.

According to the preferred embodiment of the present invention, comparison data for diagnosis is stored in a memory beforehand.

According to the preferred embodiment of the present invention, the supervisory node is positioned in the intermediate section between any two multiplex communication nodes adjacent to each other and is provided with two opening and closing switches. The provision of the two opening and closing switches causes a position in the transmission path to which a diagnosis signal is sent out twice to be changed without human intervention.

According to the preferred embodiment of the present invention, the opening and closing switch can be opened and closed manually or electrically.

According to the preferred embodiment of the present invention, this system has an ordinary control mode in which an ordinary multiplex communication for controlling vehicles is made and a diagnosis control mode in which the system is diagnosed.

According to the preferred embodiment of the present invention, a diagnosis signal is used in a broadcasting manner, and therefore a diagnosis can be made speedily.

Other objects and advantages besides those discussed above shall be apparent to those skilled in the art from the description of preferred embodiments of the invention which follows. In the description, reference is made to accompanying drawings, which form a part hereof, and which illustrate an example of the invention. Such example, however, is not exhaustive of the various embodiments of the invention, and therefore reference is made to the claims which follow the description for determining the scope of the invention.

DESCRIPTION OF THE PREFERRED EMBODIMENTS

Two embodiments of the present invention (the first and second embodiments) will be presented and explained hereinafter with reference to the accompanying drawings.

In these embodiments, the activation of a failure diagnosis program is performed with a specific switch (a maintenance switch 17). In a diagnosis mode, while a transmission path is being interrupted at one place, a diagnostic frame is output to the transmission path, and ACK signals from each of the nodes that respond to the diagnostic frame are received. Next, the transmission path is interrupted at another place and the same operation as described above is performed. From the ACK signals received twice, the number (first and second numbers) of nodes which sent back an ACK signal is counted, and the disconnected (failed) place is diagnosed on the basis of the result of this counting. The results of this diagnosis (presence or absence of the disconnections, and disconnected locations) are displayed on a CRT display device.

In the first embodiment, the interruption of a transmission path is performed manually, and in the second embodiment, it is performed electrically.

First Embodiment

Figure 1:
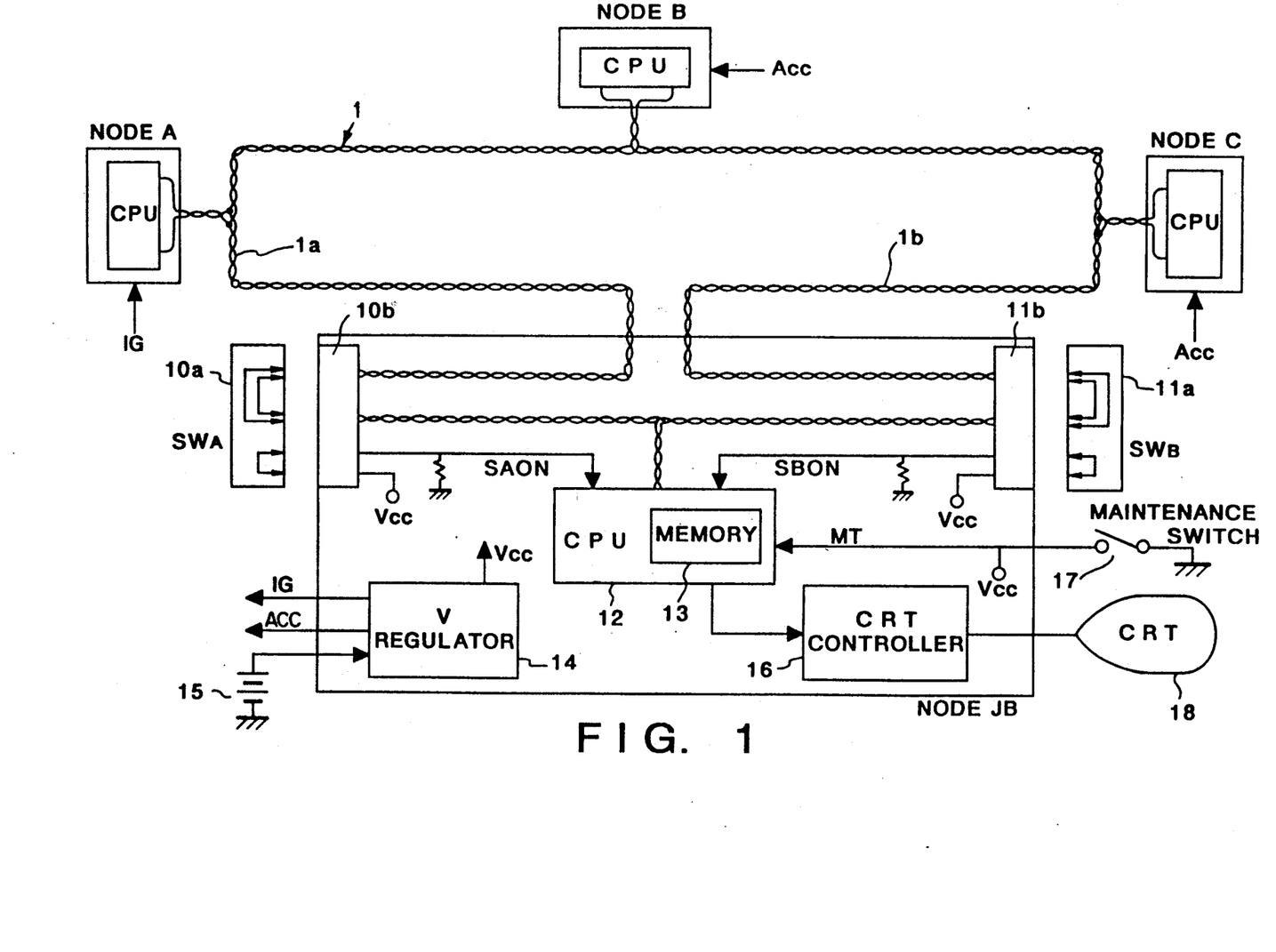
FIG. 1 is a view of the entire arrangement of a system in a first embodiment of the present invention.

FIG. 1 shows an overall schematic construction of a multiplex transmission apparatus for vehicles of the first embodiment. Numeral 1 denotes a multiplex transmission path composed of twisted pair lines, which is in the form of a loop. To the multiplex transmission path 1 are connected a multiplex node A for sending and receiving information via the transmission path 1 for controlling an air conditioner carried in a car, a multiplex node B for sending and receiving information relating to various types of switches or the like of this air conditioner via the transmission path 1, and a multiplex node C for sending and receiving information relating to various types of switches related to the steering or the like of a car via the transmission path 1. These three nodes (A, B and C) are ordinary communication nodes and have only slave functions from the viewpoint of failure diagnosis with respect to a node JB, which will be described later. The number "three" of the ordinary nodes described above serves merely as an example, and more nodes may be connected to the path 1.

In FIG. 1, the node JB is a supervisory node which has a master position over the above three nodes A to C for detecting failures of these three nodes and a disconnection of the transmission path 1. This supervisory node JB is a master in view of the fact that it sends out a diagnostic frame to all the normal nodes, and receives response signals from the normal nodes during failure diagnosis. However, from the viewpoint of the fact that it is connected to the transmission path 1 at all times, other functions can be assigned to the supervisory node JB during ordinary operation. Therefore, the supervisory node JB should have a communication function in the same way as the other ordinary nodes. The supervisory node JB is connected to the transmission path between the two multiplex nodes A and C in the transmission path 1.

The ordinary communication nodes have their respective CPUs. The CPUs perform the communication controls for their nodes and control switches, solenoids, etc. assigned to their nodes. The supervisory node JB has a role of supplying a power supply (12 V) to the other nodes A, B and C, and a function of performing the diagnosis operation. A voltage regulator 14 converts the twelve volts supplied from a battery 15 to two voltage types, IG and ACC voltages of twelve volts each. These voltages are generated in correspondence to the position of an engine key (not shown), and are supplied to the nodes A, B, and C. The voltages generate also a voltage Vcc used in a CPU 12, a memory 13, and a CRT controller 16, etc. in the supervisory node JB. The CPU 12 performs diagnosis control in accordance with the control procedure to be described later. In the memory 13 are stored this diagnosis program and the comparison data (See Table 2) to be used during this diagnosis. A CRT display device 18, which is a user interface for displaying messages necessary for diagnosis and the results of the diagnosis, is controlled by the CRT controller 16.

A maintenance switch 17 is a normally closed type switch for activating the execution of a diagnosis program. When this switch is opened, for instance, by a service technician or others, a signal of "1" MT is input to the CPU 12.

In the supervisory node JB, two switches $SW_A$ and $SW_B$ are disposed. One of the connectors $SW_A$ is interposed between the supervisory node JB in the multiplex transmission path 1 and the node A on the left side adjacent to the node JB in FIG. 1. Usually, a male section 10a is inserted into a female section 10b, thus closing the transmission path. Meanwhile, the other connector $SW_B$ is interposed between the supervisory node JB in the multiplex transmission path 1 and the node C on the right side adjacent to the node JB in FIG. 1. Similarly to the above, a male section 11a is usually inserted into a female section 11b, thus closing the transmission path 1b. By using the above two switches $SW_A$ and $SW_B$, transmission paths 1a and 1b between the supervisory node JB in the multiplex transmission path 1 and the respective two nodes A and C adjacent to the node JB can be interrupted selectively.

Figure 2:
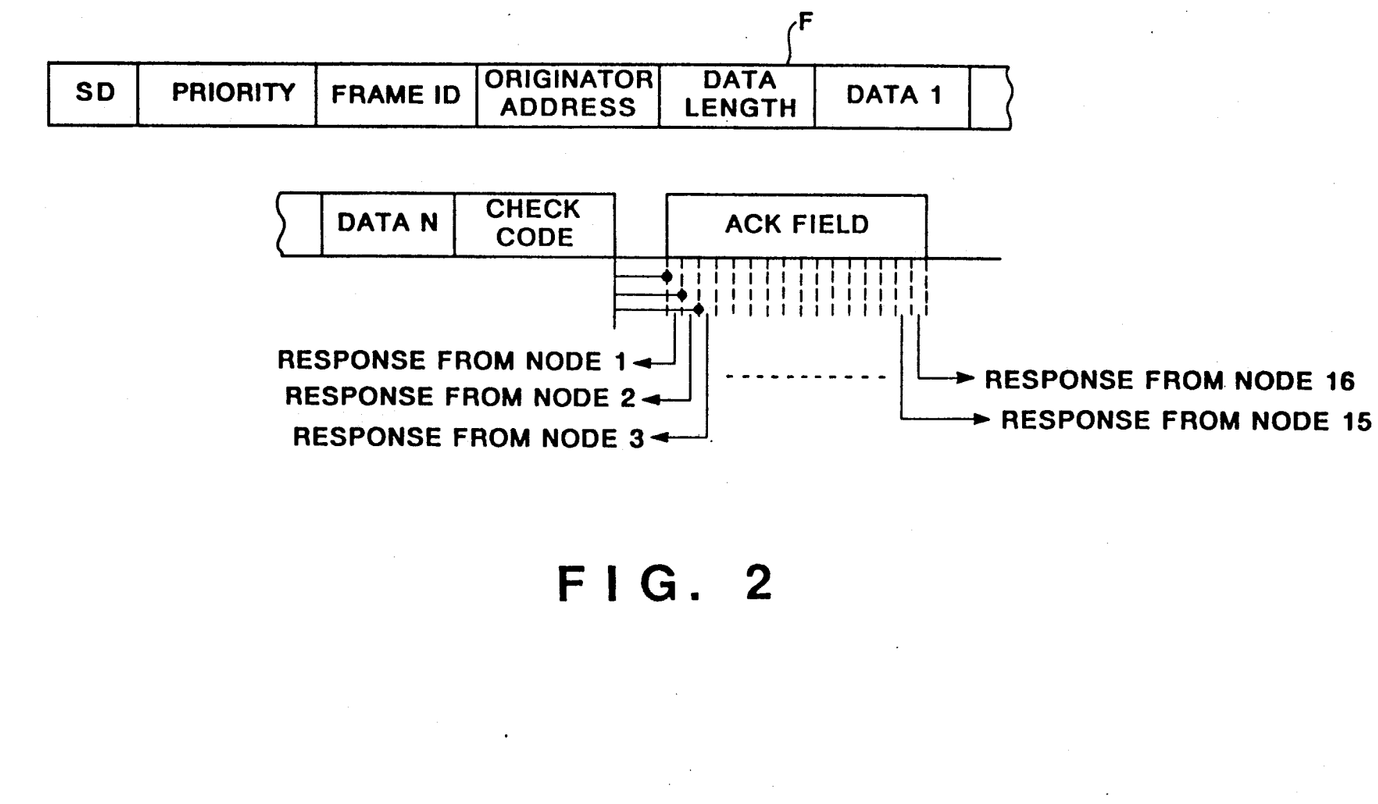
FIG. 2 is a view for explaining the format of a frame which is made to flow through a transmission path.

Next, FIG. 2 shows the format of a signal (frame) for multiplex transmission which is sent and received in the network shown in FIG. 1. This format is the same for the JB node and the other nodes. In the multiplex transmission system for vehicles of this embodiment, automobile driving information is transmitted with every frame F shown in FIG. 2. Here, the automobile driving information refers to information such that a certain switch is turned on, etc.

This frame F consists of an SD (Start Delimiter), a priority code, a frame ID code, an originator address, data length, data 1 to N, and a check code.

First, "SD code" is a specific code indicating that the beginning of the frame F has started. When a multiplex node on the reception side receives this SD code, it recognizes the beginning of the frame F. "Priority code" is used to detect the collision of transmissions in a case where a plurality of multiplex nodes transmit frames at the same time. That is, where a collision of transmissions occurs, a node with a lower priority recognizes the occurrence of the collision by knowing that the "priority code" which it sent out is changed by the "priority code" which is sent out by another node with a higher priority. Usually, a lower-level node which has recognized a collision transmits the frame again after a fixed lapse of time.

"Frame ID code" is a code for the identification of the kind of data which is assigned to each bit of a data area. In other words, it indicates in which node the frame should be used. It is equivalent to "functional addressing" described in the literature "Proposal for a Vehicle Network Protocol Standard" presented in "SAE International Congress and Exposition" (February, 1986). The "transmission originator address" is the physical address of a node which transmitted the frame F. In the system shown in FIG. 1, suppose that physical addresses "1", "2", "3", and "4" are assigned in turn to four nodes A, B, C, and JB. Then, the relationships between the frame IDs and their physical numbers are as shown in Table 1.

TABLE 1

| ID | Physical Address | | | |
|---|---|---|---|---|
| | 1 A | 2 B | 3 C | 4 JB |
| 0 | O | O | O | |
| 1 | O | | | |
| 2 | | O | | |
| 3 | | | O | |
| 4 | | | | O |
| 5 | O | | | |
| 6 | | O | | |
| 7 | | | O | O |
| . | | | | |

According to the above table, when the ID is "0", the destinations of the frame are all ordinary nodes other than the supervisory node JB. Thus, when the frame of a diagnosis of this embodiment is sent out by the supervisory node, the frame ID is set to this "0" as an example. The mode of the above table is an example, and any other settings are possible.

In "data length" of FIG. 2, the number of data that follows the "data length" is written. If it is assumed that there are N data, "N" is sent as a data length. A multiplex node that receives this frame reads out as much data as corresponds to the data length. A field that follows the data is a CRC check code (error detection code). By confirming this code, it can be affirmed that the end of the frame has been reached.

An explanation will now be given of a reception confirmation signal area (ACK field) of FIG. 2. This field is made up of a plurality of bits, for instance, 16 bits. A predefined bit area has been assigned to each of the multiplex nodes. Nodes on the transmission side check whether a reception has been made normally on the reception side based on each bit of this ACK field. The procedure for using the ACK field will now be explained in more detail. It is assumed that in the ACK field of FIG. 2, nodes A, B, and C are assigned to bits 1, 2, and 3, respectively. A certain node on the transmission side sets the bit of the 16-bit ACK field at a position corresponding to the node itself to "0" and sets the other bits to "1". That is, the node transmits one "0" bit and fifteen "1" bits following the transmission frame with a predetermined gap to the transmission path. The multiplex nodes on the reception side check whether or not the contents of the received frame are correct using a check code. If the multiplex nodes have found no errors, each of the nodes transmits the corresponding ACK bit which is set to "0" as a reception confirmation signal. As a result of the above procedure, a node whose ACK bit is "0" indicates that the node has received normally a frame.

The control of the transmission of the ACK bit is not directly related to the present invention, but it is explained in detail in U.S. Ser. No. 426,399 (filed on Oct. 25, 1989). U.S. Ser. No. 426,399 is incorporated into the present application by reference.

According to the above procedure, when the supervisory node JB transmits a diagnostic frame with the frame ID set to "0" on the transmission path 1, which nodes could respond to the diagnostic frame and which nodes could not respond to the diagnostic frame can be known on the basis of whether the respective bit in the ACK field is "0" or "1".

Next, the diagnosis of a disconnection of the multiplex transmission path 1 by the above-mentioned supervisory node JB will be explained on the basis of the control procedure of FIG. 3.

Figure 3:
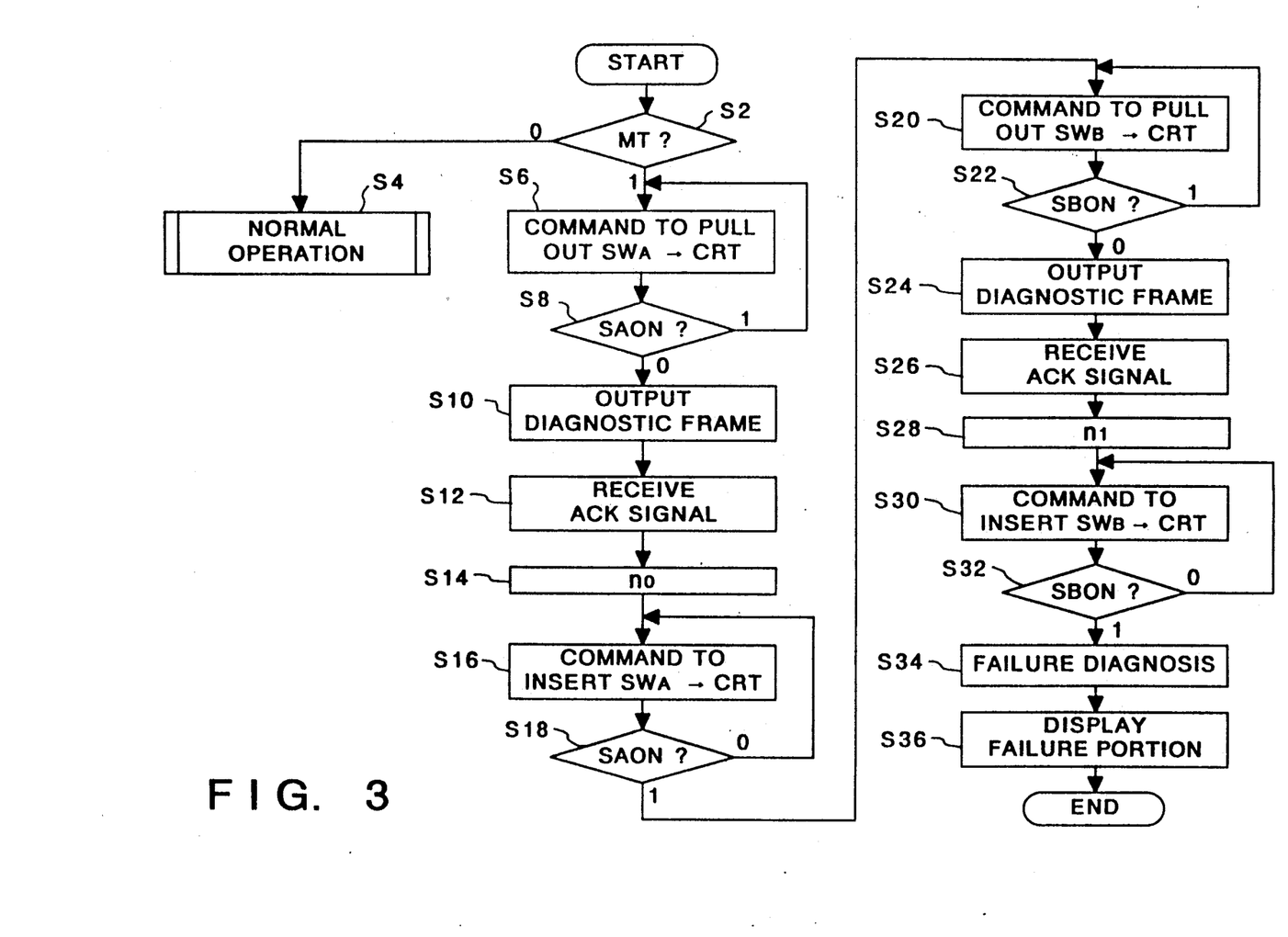
FIG. 3 is a flowchart illustrating the control procedure of a supervisory node JB in the first embodiment.

In step S2 shown in FIG. 3, whether a maintenance switch 17 is open or not is checked. When the maintenance switch is closed, assuming that the system is being placed in the normal mode, the process proceeds to step S4 where an ordinary communication control is performed. When the switch 17 is open, assuming that the system is being placed in the maintenance mode, the process proceeds to step S6 and those steps that follow.

Figure 4A:
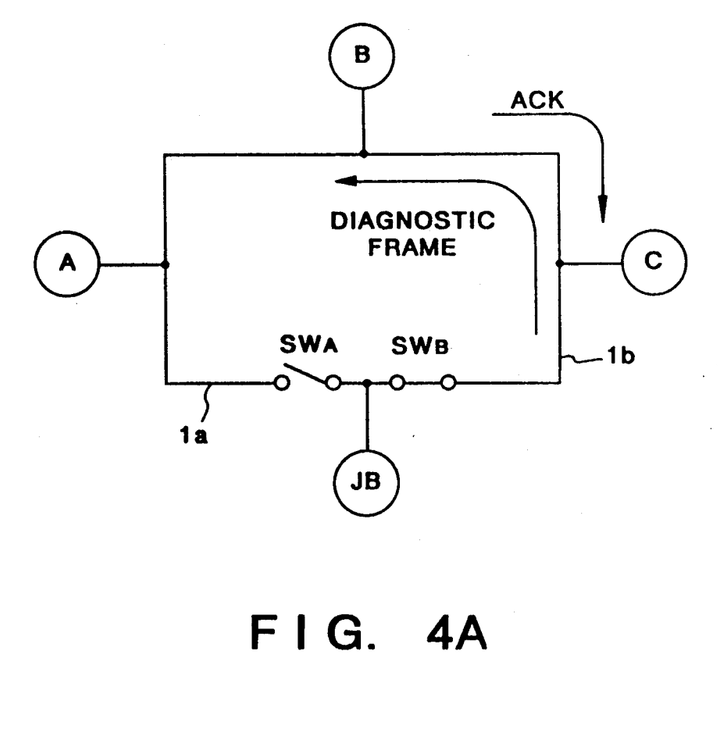
FIGS. 4A and 4B are views for explaining the technique of a diagnosis in the first and second embodiments.

In step S6, a command to pull out the male section 10a of the switch $SW_A$ is displayed on a CRT 18 so that an operator is informed of the command. The system waits for the male section 10a of the switch $SW_A$ to be pulled out. In step S8, the fact that the male section 10a is pulled out can be confirmed by the fact that a signal $SA_{ON}$ becomes "0". Through this operation, a transmission path shown in FIG. 4A is formed. In step S10, a diagnosis start frame is sent out on the transmission path 1. Nodes that have received this frame each normally send back the respective ACK bit shown in FIG. 2. The supervisory node JB receives this ACK bit in step S12. In step S14, the number of received ACK bits which are "0", that is, the number of nodes that have sent back an ACK bit, is counted. This number is stored as $n_0$.

Figure 4B:
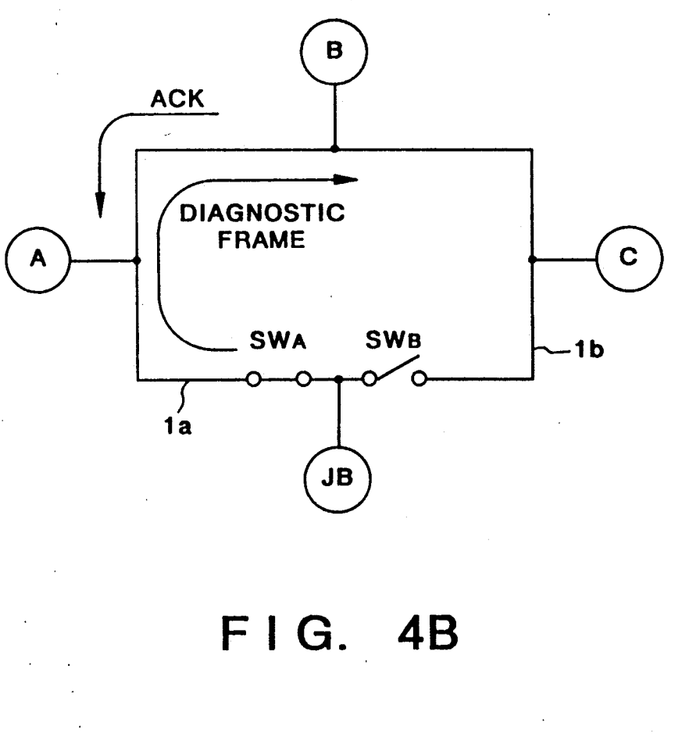

Steps S16 to S22 are operations in which the male section 11a of the $SW_B$ is removed and a transmission path signal as shown in FIG. 4B is formed. In steps S24 to S28, a diagnostic frame is sent out on the transmission path 1 shown in FIG. 4B. The returned ACK bits which are "0" are stored as $n_1$.

In steps S30 and S32, the removed male section 11a of the $SW_B$ is returned to its original position.

Figure 5:
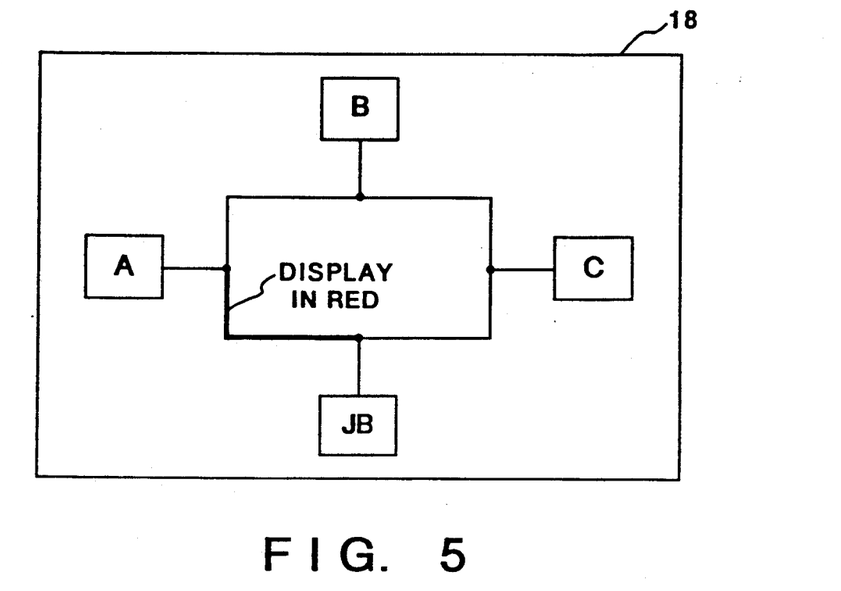
FIG. 5 is a view illustrating an example of a display showing the result of a diagnosis in the first and second embodiments.

Disconnected places in the transmission path 1 and (or) defective nodes are located on the basis of the numbers which have been obtained in step S34. The first is the number $n_0$ of ACK bits which are "0", received while the connector $SW_A$ is open. The second is the number $n_1$, received while the other switch $SW_B$ is open. Table 2 is one explaining this locating technique, showing the part of the transmission path 1 where a line disconnection has occurred and which nodes fail, when $n_0$ and $n_1$ are determined. This table is stored beforehand in the memory 13 as a table with $n_0$ and $n_1$ as inputs When a failure location is pinpointed, it is displayed on the CRT 18 in step S36. FIG. 5 explains a display manner of failure locations in the case of such a network system consisting of four nodes as shown in FIG. 1. According to an example shown in FIG. 5, a line disconnection has occurred in a portion between node A and node JB, and the portion is displayed in red. Normal portions are displayed in a color other than red.

TABLE 2

| n0 | n1 Switch $SW_B$ is open | | | |
|---|---|---|---|---|
| | 3 (A, B, C) | 2 (A, B) | 1 (A) | 0 |
| $SW_A$ is open 3 (A, B, C) | Everything is normal | — | — | Disconnection between A-JB |
| 2 (B, C) | — | — | Disconnection between A-B | Disconnection between B-JB, and node A failure |
| 1 (C) | — | Disconnection between | Disconnection between B-C and node B | Disconnection between |

TABLE 2-continued

| n0 | n1 Switch $SW_B$ is open | | | |
|---|---|---|---|---|
| | 3 (A, B, C) | 2 (A, B) | 1 (A) | 0 |
| | | B-C | failure, or disconnection between A-B and node B failure | B-C, and node A and node B failures |
| 0 | Disconnection between C-JB | Disconnection between B-JB, and C failure | Disconnection between A-B, and node B and node C failures | Disconnections between JB-C and between JB-A |

At this point, the diagnostic procedure for a line disconnection in the multiplex transmission path 1 of the embodiment system in FIG. 1 will now be explained. This table is to be used as follows: for example, when $n_0=1$ (only node C has sent back the ACK bit) and $n_1=1$ (only node A has sent back the ACK bit), a line disconnection has occurred between nodes B and C, and node B fails. Another possibility is that a line disconnection has occurred between nodes A and B, and node B fails.

A technique of a diagnosis will be explained hereinafter with reference to specific examples.

$n_0=3$ and $n_1=3$

The number $N_0$, "3" of nodes that respond in the connection of FIG. 5 means that reception confirmation signals (ACK bits) have been received from all the nodes A, B, and C. At that time, it can be determined that no line disconnection exists from the supervisory node JB through the transmission path 1b to node A, and each of the nodes A, B, and C is normal.

In this case, when the number $N_1$ of nodes that respond in the connection of FIG. 5 is "3", in addition, it can be determined that no line disconnection exists from the supervisory node JB through the transmission path 1a to node C. Therefore, as shown in Table 2, all the nodes and the entirety of the transmission path 1 can be judged to be normal.

$n_0=3$ and $n_1=0$

When $n_1$ is "0", it can be determined that a disconnection place exists in some part of the transmission path 1 from the supervisory node JB through the transmission path 1a to node A.

$n_0=3$, and $n_1=2$ or 1

As mentioned earlier, "$n_0=3$" means that reception confirmation signals (the ACK bits) have been received from all the nodes A, B, and C. Meanwhile, "$n_1=2$ or 1" indicates that a disconnection exists in the transmission path between nodes B and C, or between nodes A and B. Therefore, it is impossible for the combinations $n_0=3$, and $n_1=2$ or 1 to exist.

$n_0=2$, $n_1=1$

The case of $n_0=$"2" indicates that no line disconnection exists from the supervisory node JB through the transmission path 1b to node B, and nodes B and C are normal.

When $n_1$ is "1" in the case of $n_0=2$, it can be determined that no line disconnection exists from the supervisory node JB through the transmission path 1a to node A, and node A is normal. Thus, at the least, it can be determined that a line disconnection exists in some part of the transmission path between nodes A and B.

$$n_0=2, n_1=3$$

Like the combination of $n_0 = 3$ and $n_1 = 2$, this combination is also not possible.

$$n_0=2, n_1=2$$

"$n_0=2$" indicates that, at the least, every portion between the node JB and node B is normal. Meanwhile, "$n_1=2$" indicates that a line disconnection exists between nodes B and C. Therefore, it is not possible for the combination $n_0=2$ and $n_1=2$, to exist.

$$n_0=2, n_1=0$$

In the case of $n_0=2$ and $n_1=0$, it can be determined that a line disconnection has occurred in some part of the transmission path from the supervisory node JB through the transmission path 1a to node B, and node B fails.

$$n_0=1, n_1=1$$

When $n_0=1$, it can be determined that no line disconnection exists from the supervisory node JB through the transmission path 1b to node C and node C is normal. In this case, when $n_1=1$, it can be determined that no line disconnection exists from the supervisory node JB through the transmission path 1a to node A and node A is normal. Therefore, it can be determined that a double failure in the transmission path 1 and the multiplex nodes has occurred. As shown in Table 2, it can be determined that a line disconnection exists in some part of the transmission path between nodes B and C, and node B fails, or that a line disconnection exists in the transmission path between nodes A and B, and node B fails.

$$n_0=1, n_1=0$$

Meanwhile, when $n_1=0$, it can be determined that double failures have occurred in the transmission path and the multiplex nodes. As in the above table, it can be determined that a line disconnection exists in the transmission path between nodes B and C, and that nodes A and B fail.

$$n_0=0, n_1=0$$

When $n_0=0$ and $n_1=0$, it can be determined that a double line disconnection has occurred in the transmission path. As in the above table, it can be determined that disconnection failures exist in some part of the transmission path 1b between the supervisory node JB and node C, and in some part of the transmission path 1a between the supervisory node JB and node A.

The analysis of the other cases is the same as for the above disconnection failures, thus the explanation thereof is omitted.

Second Embodiment

In a second embodiment of the present invention, an operation for interrupting the transmission path 1 is electrically performed without human intervention.

Figure 6:
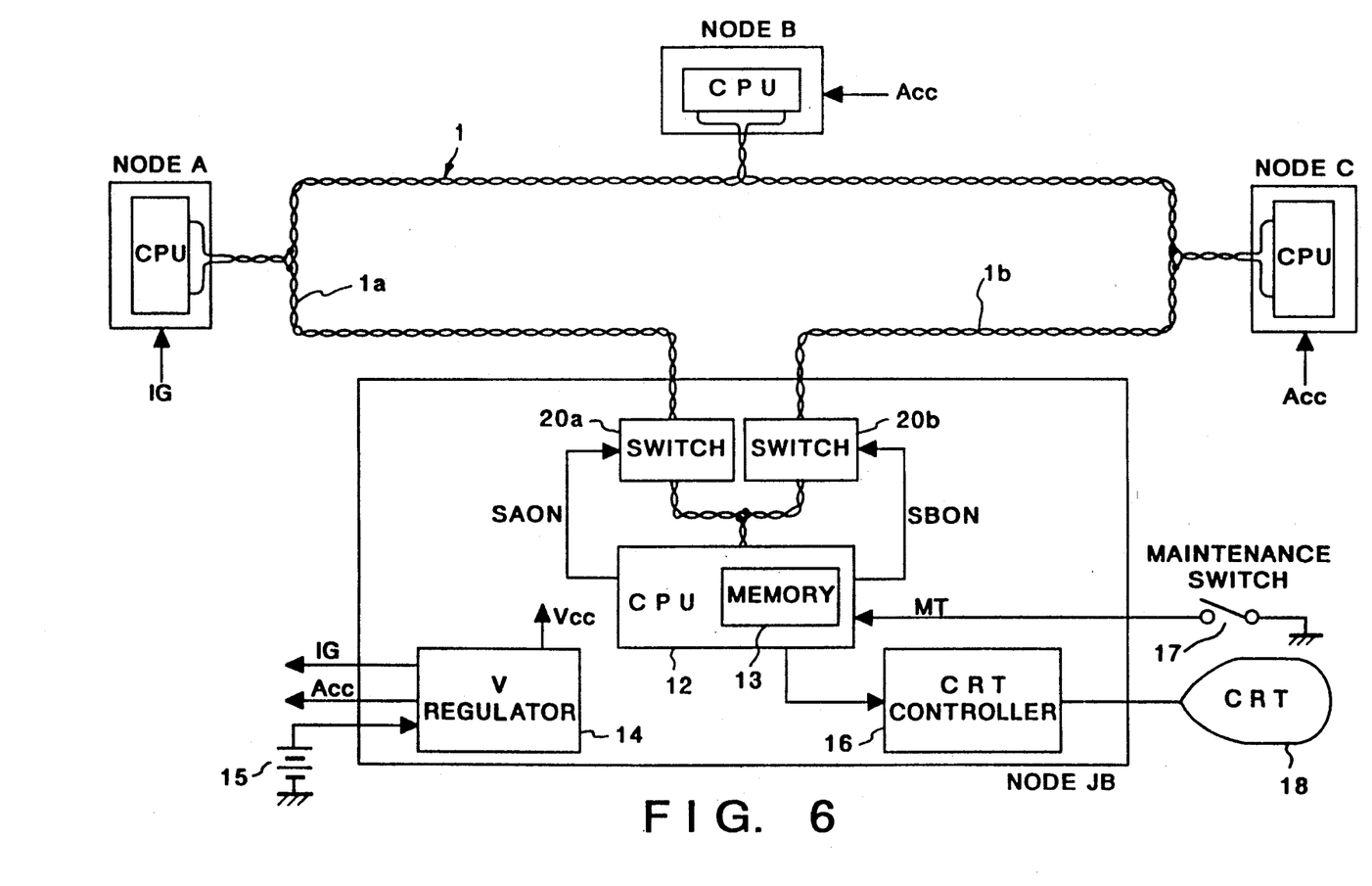
FIG. 6 is a view of the entire arrangement of a system in the second embodiment.

FIG. 6 shows the configuration of the system of this second embodiment. In FIG. 2, the same reference numerals as those used in FIG. 1 designate the same or similar components. Reference numerals different from those used in FIG. 1 designate the components of the JB node.

Figure 7:
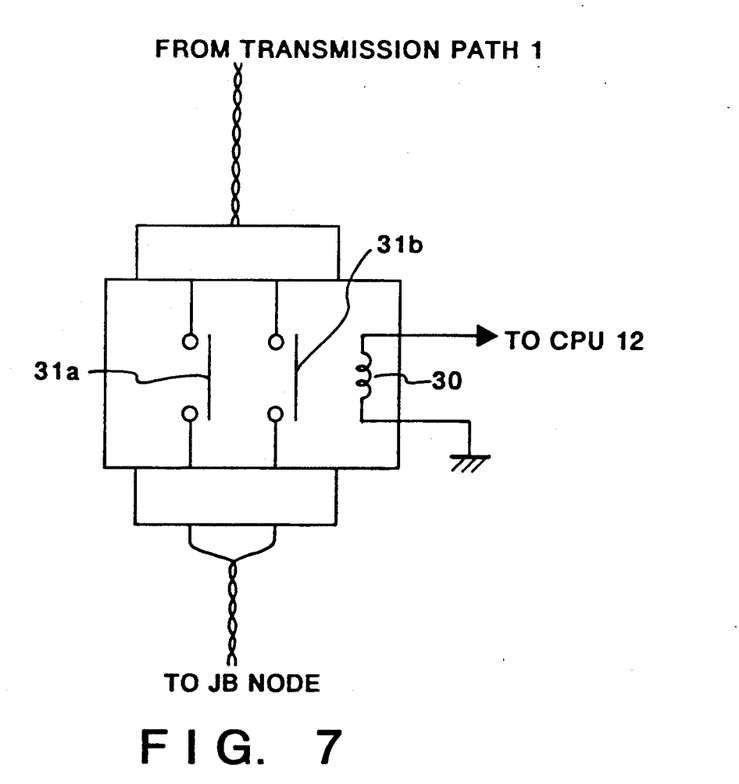
FIG. 7 is a view illustrating the construction of a program-controllable switch used in the second embodiment.

In the JB node of the second embodiment, electromagnetic opening and closing switches 20a and 20b are disposed in the transmission paths 1a and 1b, respectively, in place of the releasable switches of the first embodiment. As shown in FIG. 7, these switches consist of a solenoid 30 whose driving is controlled by the CPU 12, and two normally closed type contact points 31a and 31b, etc. When the CPU 12 sets a signal SWON or SBON to "1", a switch 20a or 20b opens, thereby interrupting the transmission path 1.

Figure 8:
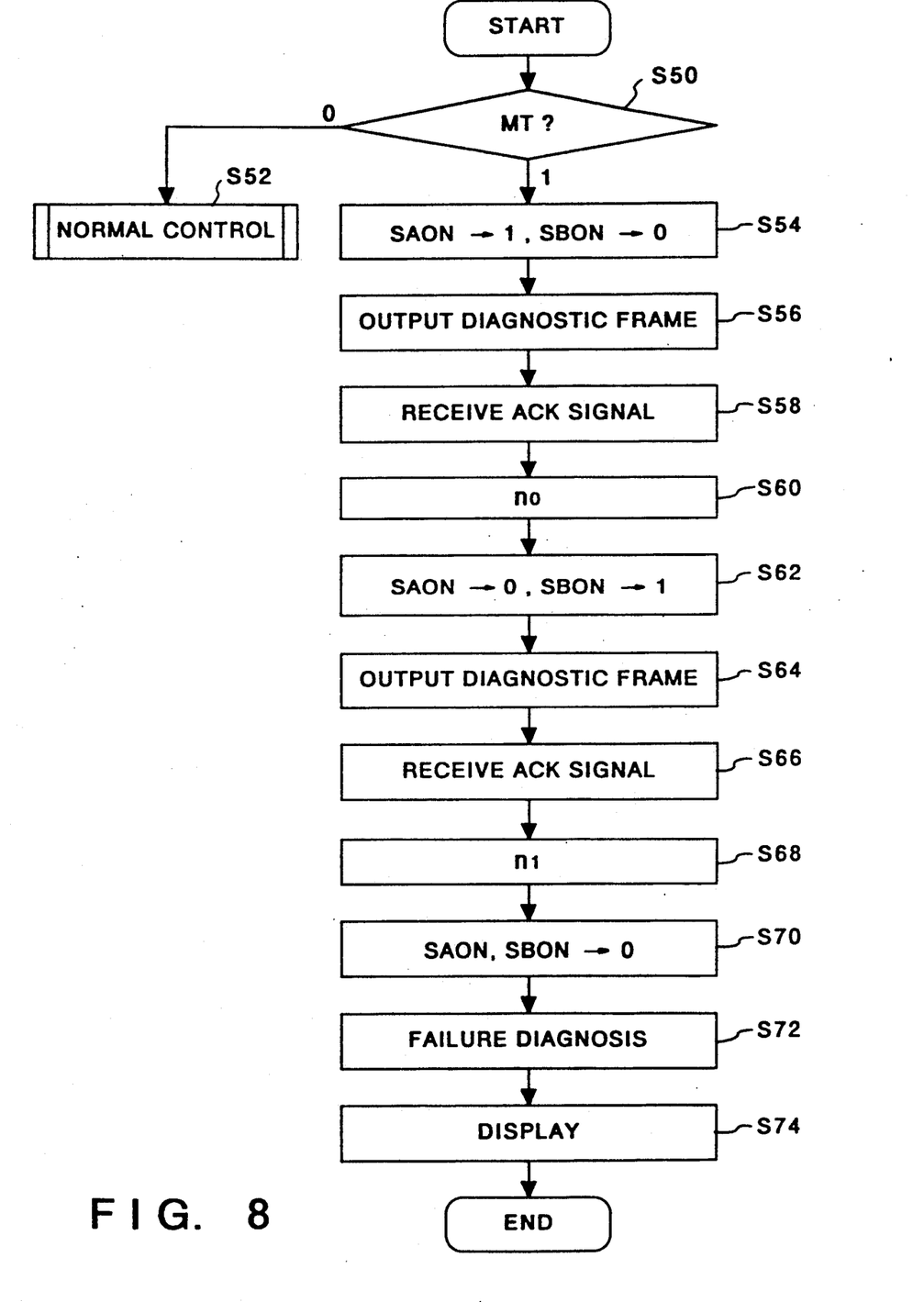
FIG. 8 is a flowchart illustrating the control procedure of the supervisory node JB in the second embodiment.

FIG. 8 shows a control procedure of the JB node in a case where the JB node is used in this second embodiment. Its basic control is the same as that of the first embodiment. In step S54, the switch 20a is opened, and the switch 20b is closed. Steps S56 through 60 are the same as steps S10 through S14 in the first embodiment. In step S62, the switch 20a is closed, and the switch 20b is opened. Steps S64 through S68 are the same as steps S24 through S28 in the first embodiment. In step S70, the two electromagnetic switches 20a and 20b are closed.

This technique using an electromagnetic switch allows an easy diagnosis without human intervention.

Advantages of the embodiments

The two embodiments explained above have the following advantages:

① Two switches are disposed in a transmission path so that a loop transmission path may be interrupted at two places. A test such that a diagnostic frame is sent on the transmission path is performed by a JB node that acts as a supervisory node in a state in which one of the above-mentioned two switches is closed and the other is open. Reception confirmation data (the ACK bits) is received by the JB node. The number of nodes that have sent back the ACK bits is determined from the number of ACK bits received in each test. From the number of these nodes, disconnection places and defective nodes are pinpointed on the basis of Table 2. In addition to the locations of the disconnection places and defective nodes, as mentioned earlier, a line disconnection at one place in the transmission path which is not ordinarily noticed is detected and posted.

② Regarding a diagnostic frame, those of a broadcasting type are used. A confirmation signal from a node on the reception side in response to this frame is a one-bit signal. This confirmation signal (the ACK bit) is assigned with a predetermined position beforehand with respect to each of the reception nodes. As a result, by using such a broadcasting type diagnostic frame and a reception confirmation signal of one bit for each node, all that is necessary is to send two diagnostic frames to the transmission path irrespective of how many nodes there are, and thus a diagnosis can be made speedily.

③ As regards a switch for interrupting the transmission path, a manual type or an electrical type may be used depending on the cost or function.

Modifications

① In the above-mentioned two embodiments, a diagnostic frame is a broadcasting type, and a reception confirmation signal is one in which one bit is assigned to one node. In comparison with this, a modification may be made such that diagnostic frames are sent to respective reception nodes, and on all such occasions the respective reception confirmation signals are received.

② In the above-mentioned two embodiments, two switches are disposed in the transmission path. The two switches are so positioned as to sandwich a point at which the JB node is connected to the transmission path. Such a configuration is made by taking maneuverability only into consideration.

Figure 9A:
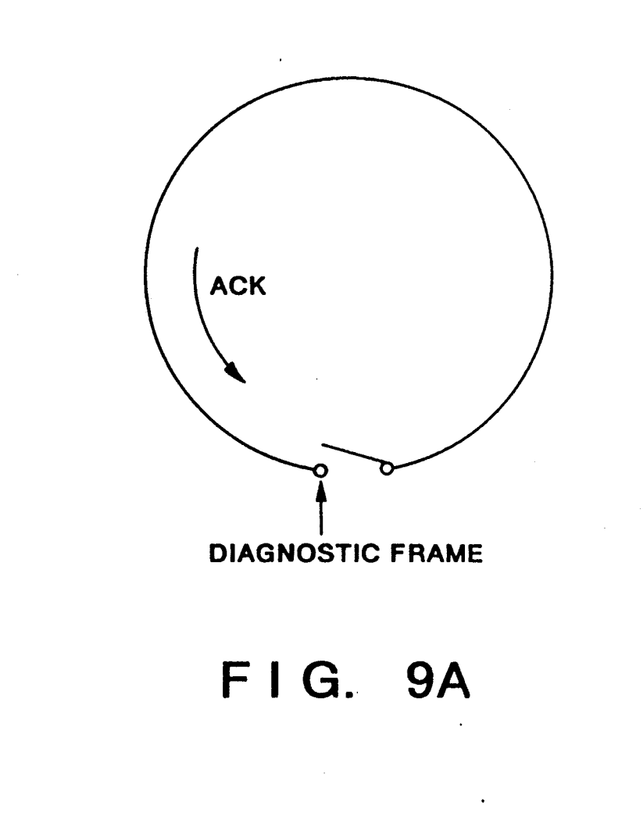
FIGS. 9A and 9B are views for explaining the principles of the diagnosis procedure in the present invention.
Figure 9B:
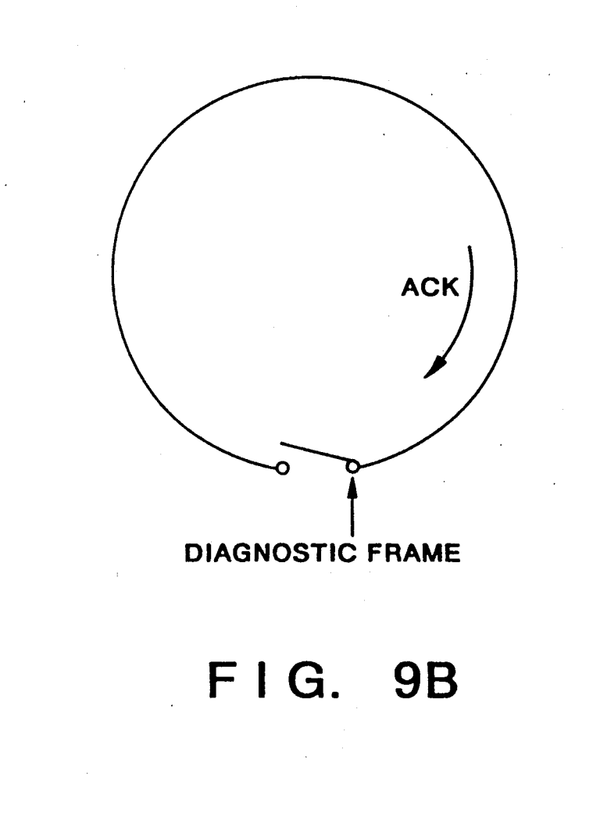

In the configuration of a switch of the present invention, in principle, one disconnection place in the transmission path will do. The essence is that a loop transmission path is not made in a loop. In the present invention, therefore, in principle, one switch is disposed in the transmission path 1, and a diagnostic frame is output from one of the end points of the interrupted transmission path and similarly the diagnostic frame is output from the other end, as shown in FIGS. 9A and 9B. According to this viewpoint, a subject that sends out a diagnostic frame is not necessarily the JB mode disposed at all times in the transmission path as shown in the above two embodiments, but may be mounted from the outside at service time.

The present invention is not limited to the above embodiments and various changes and modifications can be made within the spirit and scope of the present invention. Therefore, to apprise the public of the scope of the present invention the following claims are made.

What is claimed is:

1. A multiplex transmission system for vehicles having a multiplex transmission path formed in the form of a ring and a plurality of communication nodes connected to the multiplex transmission path in order to communicate information for controlling a vehicle with the other nodes, comprising:

said plurality of communication nodes having respective reception confirmation signal output circuits each of which outputs a reception confirmation signal on the transmission path when a predetermined diagnosis signal is received from said multiplex transmission path;

transmission path interruption means for interrupting ring formed by the transmission path at any one place of said multiplex transmission path so that said multiplex transmission path may have first and second ends thereof;

first transceiving means for outputting a first diagnosis signal on the interrupted transmission path from the first end of the interrupted transmission path and for receiving a first reception confirmation signal from each of said plurality of communication nodes in response to the first diagnosis signal;

second transceiving means for outputting a second diagnosis signal on the interrupted transmission path from the second end of the interrupted transmission path and for receiving a second reception confirmation signal from each of said plurality of communication nodes in response to the second diagnosis signal; and diagnosis means for diagnosing the position of a line disconnection in said transmission path or a defective node, on the basis of the reception communication signals received by said first and second transceiving means.

2. A multiplex transmission system for vehicles according to claim 1, said system further comprising a supervisory node, connected to said multiplex transmission path, including said transmission path interruption means, said first and second transceiving means, and said diagnosis means.

3. A multiplex transmission system for vehicles according to claim 2, wherein said first and second transceiving means are designed to have a transceiving circuit common to each other, wherein said supervisory node further includes a control means for controlling said transmission path interruption means and said tranceiving circuit so that the output of said first diagnostic signal and the reception of said first reception confirmation signal, and the output of said second diagnostic signal and the reception of said second reception confirmation signal, are performed at timings different from each other.

4. A multiplex transmission system for vehicles according to claim 1, wherein said diagnosis means counts a first number of the communication nodes that have responded to said first diagnostic signal on the basis of the first reception confirmation signals received by said first transceiving means, counts a second number of the communication nodes that have responded to said second diagnostic signal on the basis of the second reception confirmation signals received by said second transceiving means, and diagnoses disconnection places or defective nodes of said multiplex transmission path on the basis of these first and second numbers.

5. A multiplex transmission system for vehicles according to claim 4, wherein said diagnosis means includes a memory in which said first and second numbers corresponding to positions of disconnection places and defective nodes are stored beforehand.

6. A multiplex transmission system for vehicles according to claim 2, wherein said supervisory node is positioned in an intermediate section between any two communication nodes adjacent to each other, and wherein said transmission path interruption means comprises:

said supervisory node;

a first switch for opening and closing the transmission path at a point between said supervisory node and one of said any two communication nodes; and a second switch for opening and closing the transmission path at a point between said supervisory node and the other of said any two communication nodes.

7. A multiplex transmission system for vehicles according to claim 3, wherein said supervisory node is positioned in an intermediate section between any two communication nodes adjacent to each other, and wherein said transmission path interruption means comprises:

said supervisory node;

a first switch for opening and closing the transmission path at a point between said supervisory node and one of said any two communication nodes; and a second switch for opening and closing the transmission path at a point between said supervisory node and the other of said any two communication nodes.

8. A multiplex transmission system for vehicles according to claim 7, wherein said control means, at the first timing, opens the first switch and controls said transceiving circuit while the second switch is closed, then at the second timing, opens the second switch and controls said transceiving circuit while the first switch is closed.

9. A multiplex transmission system for vehicles according to claim 6, wherein said switches are opened and closed manually.

10. A multiplex transmission system for vehicles according to claim 6, wherein said supervisory node includes control means for controlling said transmission path interruption means and said switches are controlled by a program stored in said control means.

11. A multiplex transmission system for vehicles according to claim 1, said system including a mode setting means for setting the system in either a normal control mode in which said multiplex communication for ordinary vehicle control operation is made and a diagnostic control mode in which a system diagnosis operation is made.

12. A multiplex transmission system for vehicles according to claim 1, wherein said diagnostic signal is a broadcasting type message for all the communication nodes of the system and each communication node on the reception side sends out a one-bit signal as the reception confirmation signal in response to this message.

* * * * *

UNITED STATES PATENT AND TRADEMARK OFFICE
CERTIFICATE OF CORRECTION

PATENT NO. : 5,079,759
DATED : JANUARY 7, 1992
INVENTOR(S) : HIROSHI KAJIYAMA

It is certified that error appears in the above-identified patent and that said Letters Patent is hereby corrected as shown below:

Col. 2, line 36, "said" should be --the--.

Col. 6, line 21, "any" should be deleted.

Col. 7, line 45, "inputs" should be --inputs.--;

line 60, (TABLE 2 -- Col. 2), "open B" should be --open B,--;
      line 63, (TABLE 2 -- Col. 2), "(B." should be --(B,--;
      line 64, (TABLE 2 -- Col. 6), "B-JB." should be --B-JB,--.

*Col. 10, line 26, "60" should be --S60--.

Col. 11, line 49, "ring" should be --the ring--.

Signed and Sealed this

Twenty-seventh Day of April, 1993

Attest:

MICHAEL K. KIRK

Attesting Officer      Acting Commissioner of Patents and Trademarks